Feb. 13, 1968   H. N. MALMIN   3,369,150
DIMMING CONTROL FOR PLURAL DISCHARGE DEVICES
Filed May 13, 1965   2 Sheets-Sheet 2

Inventor
Harold N. Malmin
By Silverman & Cass
Attorneys

United States Patent Office 3,369,150
Patented Feb. 13, 1968

3,369,150
DIMMING CONTROL FOR PLURAL
DISCHARGE DEVICES
Harold N. Malmin, Chicago, Ill., assignor to Advance Transformer Co., Chicago, Ill., a corporation of Illinois
Filed May 13, 1965, Ser. No. 455,462
9 Claims. (Cl. 315—194)

ABSTRACT OF THE DISCLOSURE

A dimming control apparatus for controlling the energization level of a plurality of fluorescent lamp ballasts from an alternating current source in which a master dimming control selects a portion of an alternating current wave and transmits it to the ballast circuit by means of an auxiliary circuit. The master dimming control circuit has a selectively variable charging circuit, a two resistor two diode rectifying bridge, and a unijunction transistor for initiating a pulse to a pulse transformer of an auxiliary circuit. The auxiliary circuit has a pair of silicon controlled rectifiers coupled respectively to a pair of secondary windings of the pulse transformer; the primary winding of the pulse transformer being coupled to the output of the rectifying bridge. A ballast energizing control lead is coupled between the controlled rectifiers and ballast circuit; the controlled rectifiers being connected in series circuit with one of the two power leads and the ballast energizing lead to repetitively conduct at controlled intervals.

This invention relates ot a unitary master dimming control for plural discharge devices and more particularly, this invention relates to a unitary control structure effective for providing various levels of electrical energy to ballast arrangements of the type employed in energizing discharge devices such as the familiar fluorescent lamp.

In a copending patent application Serial No. 387,917 filed August 8, 1964, assigned to the assignee of this invention, there is disclosed and claimed a related structure in which arrangements were provided for effecting a unitary control on a virtually unlimited number of ballast energized devices. This "unlimited" number, of course, was efficiently realizable physically only for 600 ballasts and imposed the restriction on cooperative ballasts that full energizing potential be applied across a power factor correcting capacitor. This, in turn, necessitated the employment of high cost capacitors in the ballast arrangements employed with the apparatus of my aforementioned application. Further for energy control at the high levels necessary for this "unlimited" number of ballasts it was necessary to employ an expensive controlled rectifier element in order that adquate amounts of power might be provided.

Accordingly, it is a principal object of the present invention to provide a unitary control system for plural ballast arrangements at reduced cost.

It is a further object of the present invention to provide a control arrangement for multiple ballasts without imposing on these ballasts a requirement that these ballasts have power factor correcting capacitors of such expensive characteristic as to withstand high voltages.

It is a still further object of the present invention to provide a unitary control system for ballasts of a lesser plural number, say, 36, than the "unlimited" number 600 of ballasts which may be controlled by apparatus of the noted copending application.

The invention will be more clear and other objects, features and advantages thereof will become apparent from a consideration of the following brief description of an illustrative embodiment of the invention, shown in the drawings, and from a consideration of the appended claims.

The invention comprises generally a pair of power leads adapted for connection to a conventional source of alternating currents. These leads are connected across the primary winding of an autotransformer having a secondary winding which is connected through a current limiting resistor to a common ballast energizing lead. The one power lead and the energizing lead are both connected in circuit with a pair of parallel connected silicon controlled rectifiers and to opposite terminals of a simple, inexpensive, rectifying bridge.

The remaining two terminals of this rectifying bridge are connected in the energizing relation with the primary winding of a pulse transformer arranged in controlling relation with the grid electrodes of the aforementioned pair of controlled rectifiers. A suitable selectively variable charging circuit is connected to these last two remaining bridge terminals, the control terminals, such that the controlled rectifiers are connected in series circuit with the one power lead and the ballast energizing control lead briefly to conduct repetitively at controlled intervals. Thus, energizing power flow to the connected ballasts is supplied controllably by way of the aforementioned power lead and ballast control energizing lead under selective control of the variable charging circuit.

Meanwhile, in accordance with the invention, the aforementioned power leads are connected to associated ballasts in a manner to oppose the voltage applied by way of the energizing control leads absent conduction by the aforementioned controlled rectifiers. Thus, in the quiescent condition that the controlled rectifiers of the auxiliary circuits do not conduct, the ballasts are not suitably energized at a level to ignite and operate associated lamps.

Figure 1:
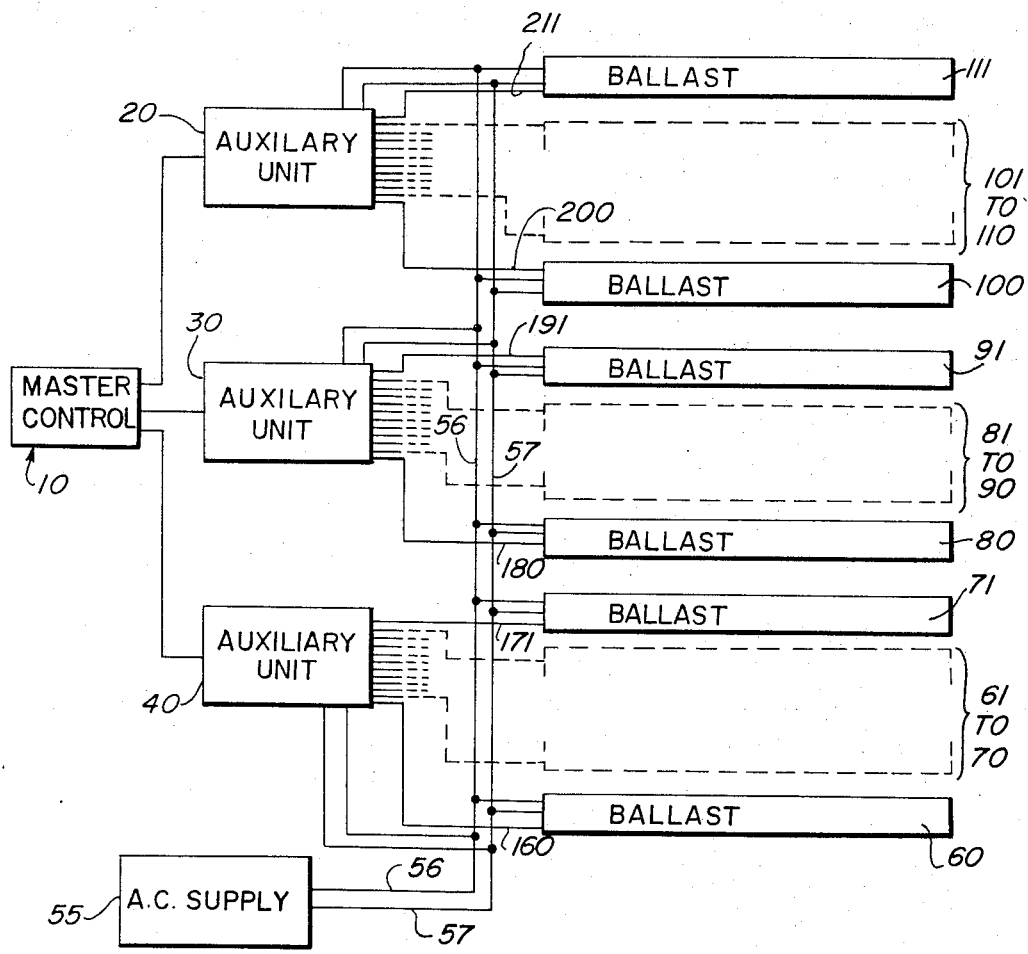
FIG. 1 is a block diagram of an arrangement representative of 36 ballasts arranged for energization and control by a unitary dimmer in accordance with the invention by way of three auxiliary units each connected by way of a single energizing control lead to an associated plurality of ballasts.

Referring now more particularly to the drawings:

In FIG. 1 there is a block diagram illustrating a complete arrangement of a unitary dimmer in accordance with the invention connected for control of three auxiliary units in accordance with the invention. These auxiliary units are, in turn, connected for energizing thirty-six ballasts indicated, but not all shown specifically. A master dimming control unit 10 is shown connected to auxiliary units 20, 30, 40 in accordance with the invention. These auxiliary units, in turn, are each connected to 12 ballasts 60–71, 80–91, and 100–111 by way of individual energizing leads 160–171, 180–191 and 200–211. It is to be noted that the ballasts, for example, those ballasts between 60 and 71, are not shown specifically for purposes of simplifying the drawing. This is also the case for ballasts 81–90 and 101–110. Corresponding ballast energizing control leads are similarly not shown but are represented by the energizing control leads 160, 171, 180, 191, and 200, 211. Power for energizing this arrangement of FIG. 1 is supplied from a conventional source of A.C. current 55 by way of leads 56, 57. As shown, these A.C. leads 56, 57 are connected to supply energizing current to each of the three auxiliary units and to each of the plural associated ballasts.

Figure 2:
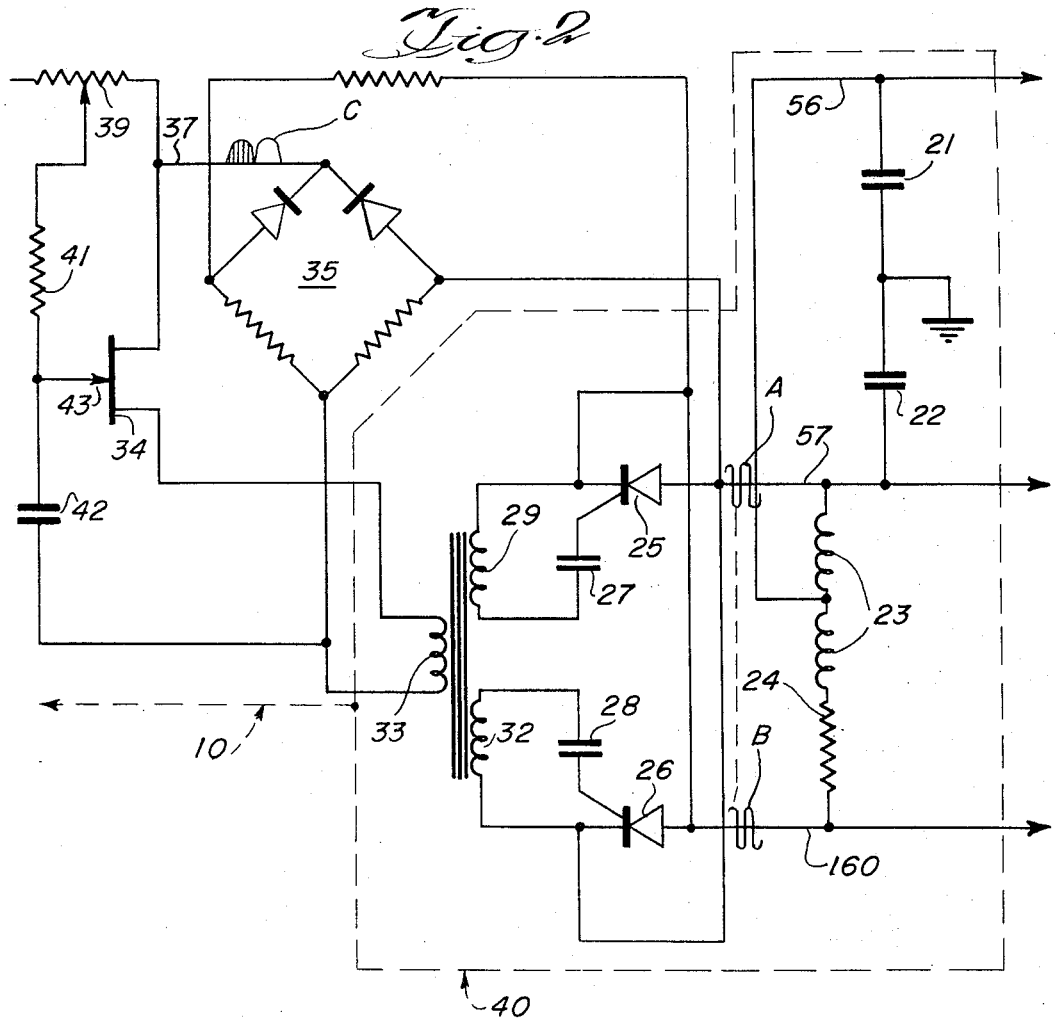
FIG. 2 is a schematic diagram of a dimming control unit accordance with the invention arranged in cooperative relation with a single auxiliary unit having connections for association with a limited plural number, say 12, of lamp energizing ballasts.

Turning next to the schematic diagram of FIG. 2, here is shown in detail the dimmer circuit of FIG. 1 in association with a representative one auxiliary unit 40 of the plural such units shown in FIG. 1. For clarity of the illustration, the master dimmer control unit 10 is shown enclosed in dashed lines as in the representative auxiliary unit 40. In each of these auxiliary units the alternating current on leads 56, 57 is applied from the source across series connected filter capacitors 21, 22 which are center tapped to ground as shown. These relatively large filter capacitors are provided for short circuiting any radio frequency pulses which may appear on the leads 56 and 57. An auto transformer 23 is connected between the one power supply lead 57 and the ballast energizing control lead 160. The other power lead is connected at a point between the primary and secondary windings of this autotransformer 23, as shown. This autotransformer connection between leads 57 and 160 is completed by way of a current limiting resistor 24 having utility as discussed hereafter. The wave form A thus illustrates the alternating current voltage wave applied on the lead 57 with respect to the lead 56. Correspondingly the wave form B illustrates approximate phase relation of the wave form B appearing on the energizing control lead 160 as a result of the step-up action of the autotransformer 23. The time phase of these two waves A, B is indicated by the connecting dashed line. These waves are applied to the cathode and anode electrodes of silicon controlled rectifiers 25, 26, as shown. The anode electrodes of the silicon controlled rectifiers 25, 26 are respectively connected to the ballast energizing control lead 160 and to the power lead 57, as illustrated. The control electrodes of these two rectifiers are respectively connected to the cathode electrodes thereof by way of coupling capacitors 27, 28 and two pulse transformer secondary windings 29, 32. The primary winding 33 of this pulse transformer is connected at opposite ends to one pair of diagonally opposite terminals of a simple two diode, two resistor rectifying bridge 35 by way of the base, or conduction, electrodes of a unijunction transistor 34. The remaining pair of terminals of this bridge 35 are directly connected to the ballast energizing control lead 160 and power lead 57 as shown. For economy, the bridge 35 is an elementary rectifying bridge having simple resistors in one pair of adjacent arms and a pair of like poled diodes in the opposite pair of arms. By the employment of these resistors the cost of this bridge is reduced materially over the cost of comparable four diode rectifying bridges.

Recalling that the wave form B is a stepped up, phase displaced version of the voltage A appearing on lead 57 by the connections illustrated, it is clear the voltage represented by the wave form B is applied to the bridge 35 across the horizontally opposite terminals thereof. Thus, on the lead 37 associated with the diagonally opposite, upper terminal of this bridge 35, there appears a wave form C having an envelope as indicated. That is, the bridge 35 rectifies the wave form B such that consecutive half sine wave pulses of like polarity appear on this lead 37. The generation of the vertical stripes indicated in this wave form C will become later apparent. Now, this rectified voltage represented by the wave form C is applied by way of variable resistor 39 and padding resistor 41 to a charging capacitor 42 and to the emitter electrode 43 of the unijunction transistor 34. The padding resistor 41 insure that, whether the setting of the variable resistor 39, no direct connection will be made from the lead 37 to the emitter electrode 43. Instead, resistor 41 in series with resistor 39 controls the exponential charging of capacitor 42 as the wave form C increases from a zero potential. Thus, this capacitor 42 is exponentially charged through these resitor 39 and 41 until the electrode 43 reaches a potential which, in a practical case, is approximately ⅔ that of the associated base conduction electrode which is connected directly to the lead 37. When this ⅔ triggering level is reached, the unijunction transistor 34 conducts as a very low, substantially zero resistance through the pulse transformer primary winding 33 to discharge capacitor 42.

Such a conduction pulse is coupled through the secondary windings 29 and 32 to the control electrodes of the controlled rectifiers 25, 26. Thus, in dependence upon the relative voltages appearing at the cathode electrodes of these controlled rectifiers, one or the other of the rectifiers 25, 26 will conduct upon passage of current through the primary winding 33. As indicated by the vertical stripes in the wave form C, the charging components associated with capacitor 42 are such that this capacitor will charge to a firing voltage for unijunction transistor 34 and discharge several times in the course of one cycle of the wave C, in a practical situation.

It should here be observed that the potential applied to the controlled rectifiers 25, 26 are requisite to allow conduction by these rectifiers only during intervals that conduction potentials appear across the cathode-anode electrodes of these controlled rectifiers. The autotransformer 23, connected as shown, insures that such conduction potentials are continuously so applied from the A.C. leads 56, 57 by way of control lead 160. This important feature of applicant's invention insures appropriate control pulses being available to all connected ballasts without dependence on the connections through any individual ballast such as the high voltage capacitor ballast of my copending application.

In a practical situation relating to the left hand sinusoidal envelope of wave form C, the anode electrode of controlled rectifier 26 continues positive throughout a full half cycle of wave form B and the cathode electrode of this controlled rectifier 26 is correspondingly negative as a result of the application of wave form A thereto. Now, as an appropriate pulse is applied from the transformer primary 33, the controlled rectifier 26 is properly poled for conduction which is initiated by a properly poled pulse from the secondary winding 32 applied through capacitor 28. Thus, so long as unijunction transistor 34 conducts, the vertically disposed opposite terminals of the bridge 35 are effectively short-circuited save for that small voltage appearing across the transformer primary 33. This short-circuiting corresponds, of course, to one of the vertical stripes in the wave form C. The charging constant associated with capacitors 42 are such that, with a 60 cycle voltage signal being applied across 56, 57, the unijunction transistor may conduct illustratively ten times during a single half cycle of this signal. During a next half cycle of the wave form B, a negative half cycle as shown, the wave form A is positive and the controlled rectifier 25 is biased for conduction in a forward direction. Under control of the signal coupled from the transformer secondary winding 29 by way of capacitor 27, this controlled rectifier may conduct. Now, whichever one of the controlled rectifiers 25, 26 conducts, by the illustrated cross-connections of the cathode of one to the anode of the other, it is clear that the leads 57 and 160 are effectively short circuited in correspondence with each of the vertical stripes seen in wave form C in dependence upon the setting of the variable resistor 39. This, it has been seen, governs the charging of capacitor 42. Accordingly, the leads 57, 160 are repetitively cross-connected as one or the other of the controlled rectifiers 25, 26 conducts. Clearly by reducing the resistance of potentiometer 39, the number of vertical stripes indicated in wave form C will be increased for each half cycle of this wave form. This, of course, results from the fact that the capacitor 42 takes less time to charge to a firing potential for unijunction transistor 34.

Let us examine the effect of this cross connecting of leads 57, 160 as this cros-connecting is varied in rate by operation of the potentiometer 39. Let us turn, for this examination, to the representative ballast of FIG. 3. In this FIG. 3, as well as in the accompanying FIG. 4, the ballast there illustrated is shown with appropriate leads for connection to the indicated leads of FIG. 2 by corresponding numbers. The ballast of FIG. 3 includes, on a common core indicated but not designated by numerals, a primary P, a series connected secondary $S_1$, a filament winding $F_2$, and two series connected secondary windings $S_2$, $S_3$, which are separated from the first mentioned two windings by a grapped shunt as indicated by triple verticle lines. A left terminal of $S_2$ is fixed in phase with respect to $S_1$ by a 2.2K resistor 415 in series with a small capacitor 416. A small capacitor 408 is connected across the primary winding P for by-passing stray, high frequency radio signals. The low voltage secondary $S_1$ is connected by way of leads 401, 403, which are adapted for heating energization of one filament of a fluorescent lamp. The secondary winding $F_2$ is connected to corresponding leads 405, 407 which are similarly adapted for energizing an opposite filament winding of a fluorescent lamp.

Now in the situation that neither of controlled rectifiers 25 or 26 is conducting, leads 57 and 160 are isolated from one another and the opposite voltage represented by wave form B, opposite, that is, to the voltage represented by wave form A, is applied to the secondary winding $S_3$ by control lead 160, as shown, to oppose the voltage which would be generated in this secondary winding $S_3$ by the application of supply voltage on leads 56, 57. In view of this opposing voltage situation, it is clear that the opposite lamp filaments associated with leads 401 and 403, 405 and 407, by the connection shown, are at a low potential difference such that little or no conduction by the lamp takes place. Now, however, in the condition that lead 160 is connected directly to lead 57, a condition which is effected by the conduction of either silicon controlled rectifier 25 or 26, the aforenoted opposite lamp filaments are subjected to aiding voltages, induced by current flow in winding P, and the lamp ignites. This conduction, it will be recalled, is coincident with the vertical stripes indicated in wave form C of FIG. 2. It will be recalled too, that the occurrence of these vertical stripes in wave form C is adjustable in frequency by variation of resistor 39 to enable more, or less rapid charging of capacitor 42.

Figure 3:
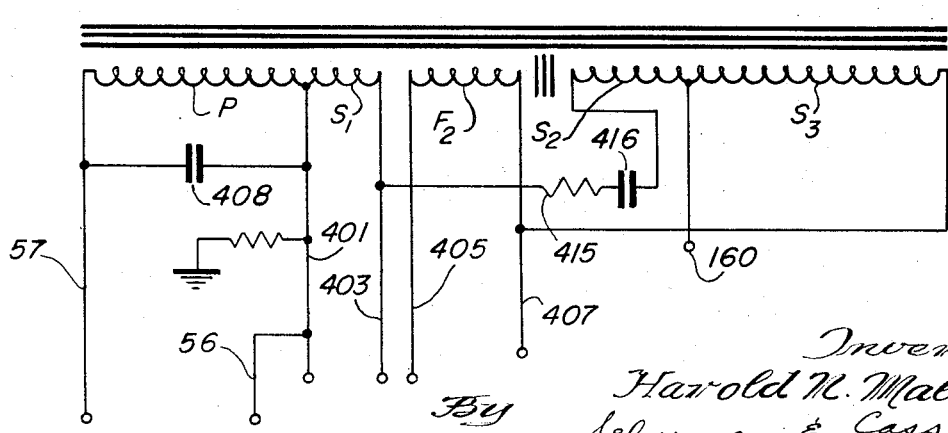
FIG. 3 is a partial schematic diagram of an economical ballast for advantageous employment with the structure of FIG. 1.

Now it will be observed in FIG. 3 that the power supplying voltages on leads 56, 57 are out of phase with the lamp current flowing to the opposite lamp filaments associated with leads 401, 403 and 405, 407. This follows, of course, from the illustrated inductive nature of the coupling from the leads 56, 57 to these opposite lamp filaments. Thus, the ballast of FIG. 3 may suffer in some measure from lack of efficient power utilization. This efficacy in power utilization however, may be compensated by the lesser cost of the simplified ballast of FIG. 3 over other more complex and efficient ballasts.

Figure 4:
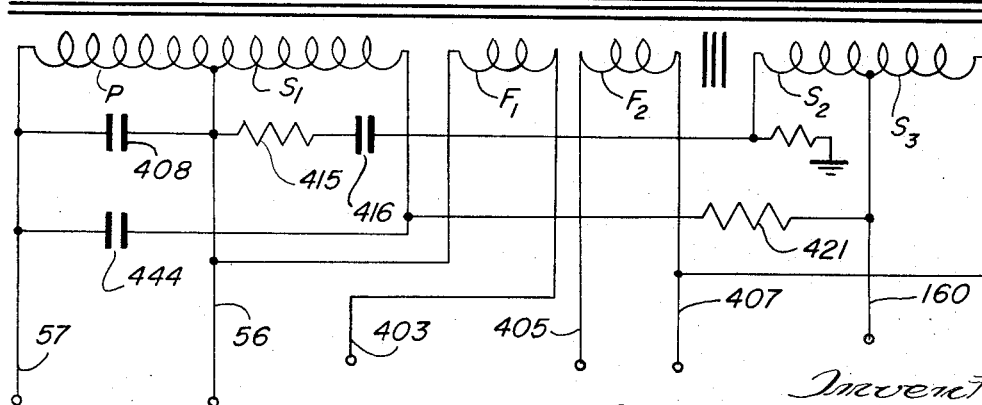
FIG. 4 is a partial schematic diagram illustrating a more expensive, more efficient ballast also adapted for employment with the structure of FIG. 1 by the connections shown.

Such a more complex and efficient ballast is disclosed in the aforenoted application Serial No. 387,917, filed August 6, 1964. Such a ballast is shown schematically in FIG. 4 with corresponding leads similarly numbered for utilization with the structure of FIG. 2. In the structure of FIG. 4, it will be observed that a large capacitor 444, illustratively a 3.9 microfarad capacitor is connected across the windings P, $S_1$ and in series with a relatively large isolating resistor 421 to the energizing control lead 160. Such a resistor 421, typically, may be of a value of 15 kilohms (15K). Thus, in the cross-connected condition of leads 57, 160, occasioned by firing of one of the two paired controlled rectifiers noted heretofore, voltages applied to the leads 56, 403 and 405, 407, for opposed lamp filaments are adjusted in power factor to correspond with the power supplied to leads 56, 57. In this fashion more efficient utilization of the electrical power supplied is accomplished in transforming this power to light from fluorescent lamps associated with the ballast of FIG. 4. For such effective utilization of applied power from the leads 56, 57 it is noted that this ballast of FIG. 4 requires the utilization of the relatively large capacitor 444 which is connected directly to the power leads 56, 57 by way of transformer secondary winding $S_1$. In order to accomplish appropriate power factor correction in suppling lamp energizing currents, this capacitor advantageously must be both very large and it must withstand a relatively high voltage. Accordingly, capacitor 444 becomes a relatively expensive oil filled capacitor. As shown in FIG. 4, this oil filled capacitor is connected in circuit with the large isolating resistor 421 (15 kilohms illustratively) and thence to the energizing control lead 160. Thus, effectively, the ballast of FIG. 4 provides a complete conductive current path between the leads 57 and 160 for firing of either of the silicon controlled rectifiers 25 and 26 by way of the ballast windings P, $S_1$. Thus, lead 160 being short circuited to lead 57 by the firing of a rectifier, the isolating resistor 421 is bypassed.

In the less expensive non-power factor corrected ballast of FIG. 3 no comparable path exists. This appears in considering the value normally associated with capacitor 416. Typically this capacitor is 5,000 micro-microfarads which, effectively, at 60 cycle power frequencies, is an infinite impedance or open circuit. In accordance with the invention, however, as seen in FIG. 2, this deficiency is remedied by virtue of the connection between leads 57 and 160 through the autotransformer 23 and the current limiting resistor 24. Thus, the dimming control in accordance with the invention eliminates need for expensive components in multiple lamp energizing ballast arrangements.

The invention has been described in connection with one illustrative embodiment thereof in advantageous association with two representative, cooperative lamp energizing ballasts. It will be clear to those skilled in the art that numerous and varied modifications may be made without departing from the spirit and the scope of the invention which is set forth in the appended claims.

What is claimed is:

1. Dimming control apparatus for controlling the energization level of a plurality of fluorescent lamp ballasts from a source of alternating current, each ballast of said plurality having first and second input leads adapted for connection across a source of alternating current and a third input lead adapted for connection to a ballast energizing control lead, said control apparatus comprising, an autotransformer connected from said second input lead to said ballast energizing control lead, a tap on said autotransformer connected to said first input lead, a pair of three terminal controlled rectifiers, each having an anode electrode, and a cathode electrode for rectified current conduction therethrough and a control electrode, the anode and cathode electrodes being interconnected from one rectifier to another, said ballast energizing control lead connected to the cathode electrode of one of said rectifiers and to the anode electrode of the second of said rectifiers, and means for applying enabling control pulses to the control electrodes of said rectifiers, whereby said rectifiers are driven alternately to conduction thereby to effect electrical connection between said ballast energizing control lead and one said current source connected leads.

2. Apparatus as set forth in claim 1 wherein said control pulse applying means comprises a rectifying bridge having a first and second pair of diagonally opposite terminals, and a pulse transformer having a primary winding and a pair of secondary windings connected respectively between control and cathode electrodes of said pair of rectifiers, said primary winding being connected in series with said first pair of bridge terminals, whereby conduction initiating pulses are applied to the rectifiers of said pair in dependence upon conduction from said rectifying bridge first terminal pair.

3. Apparatus as set forth in claim 1 and, in combination therewith, a controlled conduction device responsive to a threshold exceeding signal for applying enabling pulses to said controlled rectifiers, and a control charging circuit for said conduction device which comprises a capacitor and a variable resistor, said charging circuit being connected to one of said first and second input leads for variably applying threshold exceeding signals to said conduction device, thereby to enable said controlled rectifiers in timed spacing in accordance with the adjustment of said variable resistor.

4. A control circuit for variably enabling a plurality of fluorescent lamp energizing ballasts which comprises, a pair of input leads for connection to a source of alternating current, a ballast energizing control lead for each of said ballasts, means for connecting said pair of input leads to a primary winding of each ballast, means connecting conductively isolated secondary windings of each said ballast to its associated ballast energizing control lead, controlled rectifier means for variably connecting said ballast energizing control lead conductively to one input lead of said pair and a pulse transformer coupled between a rectifying bridge and said controlled rectifier means, whereby the ballast primary winding and the secondary windings are conductively connected through said ballast energizing control lead, thereby to establish a conductive path through fluorescent lamps associated with each ballast by way of said primary and secondary windings in consequence of conduction by said controlled rectifier means.

5. Dimming control apparatus for controlling the energization level of a plurality of fluorescent lamp ballasts, each ballast having a primary winding and a conductively isolated secondary winding, from a source of alternating current which comprises, first and second leads adapted for connection to a source of alternating current, a pair of controlled rectifiers, each having a control electrode and first and second conduction electrodes, a ballast energizing control lead connected to opposite conduction electrodes of said pair of controlled rectifiers, the remaining conduction electrodes of said rectifiers being connected to one of said first and second adapted leads, said ballast energizing control lead being connected to said conductively isolated secondary windings, the primary windings of the ballasts of said plurality being connected to said pair of adapted leads, a rectifying bridge having a first and a second pair of diagonally opposite terminals, and variable means coupled to said rectifying bridge for applying controllably time spaced signals to the rectifiers of said pair, whereby, upon conduction of one of said rectifiers, an associated ballast secondary winding is connected conductively to said primary winding thereby energizing a ballast associated lamp.

6. Apparatus as set forth in claim 5 wherein an autotransformer is connected between like conduction electrodes of said rectifiers, said autotransformer comprising a primary winding having opposite terminals connected to said first and second adapted leads, whereby an increased conduction voltage is applied to said rectifier conduction electrodes and to said energizing control lead.

7. Apparatus as set forth in claim 6 and, in combination therewith, a current limiting resistor connected between said autotransformer and one rectifier conduction electrode.

8. Apparatus as set forth in claim 5 wherein said variable means comprises, means connecting said first pair of bridge terminals between one of said pair of adapted leads, and said ballast energizing control lead, means connecting said second pair of bridge terminals for applying conduction control pulses alternatively to the rectifiers of said pair, and variable capacitor charging means for allowing conduction from said bridge second pair of terminals.

9. Apparatus as set forth in claim 8 wherein said variable capacitor charging means comprises, a unijunction transistor having a control electrode and a pair of conduction electrodes, a capacitor connected between one of said last named conduction electrodes and said transistor control electrode, said last named pair of conduction electrodes being connected in series between said second bridge terminal pair, and said capacitor being connected in a parallel path across said second bridge terminal pair, whereby charging of said capacitor allows conduction from said second bridge terminal pair to energize said controlled rectifiers.

References Cited
UNITED STATES PATENTS

| | | | |
|---|---|---|---|
| 3,130,347 | 4/1964 | Harpley | 315—98 |
| 3,170,085 | 2/1965 | Genuit | 315—227 |
| 3,249,806 | 5/1966 | Genuit | 315—194 |
| 3,323,014 | 5/1967 | West | 315—196 X |

JAMES D. KALLAM, *Primary Examiner.*

JOHN W. HUCKERT, *Examiner.*

R. F. POLISSACK, *Assistant Examiner.*